United States Patent [19]

Gros

[11] 3,868,337

[45] Feb. 25, 1975

[54] VINYLIDENE FLUORIDE/HEXAFLUOROPROPYLENE COPOLYMER FOAMS

[75] Inventor: Paul Gros, Loches, France

[73] Assignee: Society Superflexit, Courbevoie, France

[22] Filed: Aug. 16, 1972

[21] Appl. No.: 281,151

[30] Foreign Application Priority Data

Aug. 19, 1971 Great Britain.................... 39036/71

[52] U.S. Cl..... 260/2.5 R, 260/23 XA, 260/87.5 A, 260/87.7, 264/54
[51] Int. Cl. ........................ C08f 47/10, B29d 27/04
[58] Field of Search........... 260/2.5 R, 87.7, 23 XA, 260/87.5 A; 264/54

[56] References Cited
UNITED STATES PATENTS
3,023,187   2/1962   Lo...................................... 260/87.7

OTHER PUBLICATIONS

Viton in Mechanical Goals; Deskin et al., Dupont "Viton" Bulletin No. 12, May 1964, TS 1925 D95v.

Cellular Viton, Haaf et al., Dupont "Viton" Bulletin No. 27, 1968, TS 1925 D95v.

*Primary Examiner*—Wilbert J. Briggs, Sr.

[57] ABSTRACT

Closed-cell foams are prepared from low viscosity vinylidene fluoride/hexafluoropropylene copolymers by vulcanising the copolymer in the presence of a blowing agent using as vulcanisation agent a metal oxide or hydroxide. Particular vulcanisation agents are the oxides and hydroxides of lead and calcium, and mixtures of the oxides and hydroxides of magnesium and zinc with lead or zinc salts.

13 Claims, No Drawings

VINYLIDENE FLUORIDE/HEXAFLUOROPROPYLENE COPOLYMER FOAMS

The present invention relates to a process for the preparation of a closed-cell foam of vinylidene fluoride/hexafluoropropylene copolymers of low viscosity.

It is known that vinylidene fluoride/hexafluoropropylene copolymers of low viscosity, which possess the following structural unit:

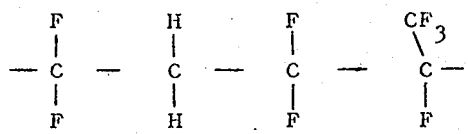

have properties which make them attractive for use in various applications. For example, they have excellent chemical resistance, outstanding heat stability and good ageing resistance.

Numerous elastomer foams, obtained either from latex or from dry rubber, exist. However, in the case of polyfluorinated elastomers of low viscosity, such as vinylidene fluoride/hexafluoropropylene copolymers, it has not been possible hitherto satisfactorily to produce closed-cell foams on an industrial scale.

A process has been proposed for producing a closed-cell foam of vinylidene fluoride/hexafluoropropylene copolymers, according to which a mixture consisting of a vinylidene fluoride/hexafluoropropylene copolymer, a blowing agent, an activator for the blowing agent and a plasticiser, is partially vulcanised in the presence of magnesia (MgO.7H$_2$O) before being blown. However, this process results in the formation, in poor yield, of a closed-cell foam which is practically useless (as is demonstrated hereinafter in the comparison Example) and the amount of waste is such that it would in practice be necessary to use, for example, presses with a surface area of 1 square metre in order to obtain at most a surface area of acceptable foam of about 0.09 square metre.

We have now devised a process which overcomes or mitigates the disadvantages associated with prior known processes and by which closed-cell foams of vinylidene fluoride/hexafluoropropylene copolymers can be made in markedly improved yield. We have found that, surprisingly, by using at least one basic metal oxide or hydroxide, optionally in combination with one or more lead or zinc salts, as the vulcanising agent, it is possible to prepare closed-cell foams of vinylidene fluoride/hexafluoropropylene copolymers in good yield on an industrial scale.

Accordingly, in one aspect the invention provides a process for the preparation of a closed-cell foam from a low viscosity copolymer of vinylidene fluoride and hexafluoropropylene, wherein the copolymer is vulcanised in the presence of a blowing agent and wherein the vulcanising agent is a basic metal oxide or hydroxide.

Oxides or hydroxides of lead, calcium, magnesium or zinc can be used as the vulcanising agent. The oxides and hydroxides of lead and calcium can be used without being combined with one or more metal salts of lead or zinc. On the other hand, the oxides and hydroxides of zinc and magnesium, when used alone, do not usually give good yields, and as a result it is desirable to combine them with at least one lead or zinc salt.

The invention further includes a process for the preparation of a closed-cell foam from vinylidene fluoride/hexafluoropropylene copolymer of low viscosity using a vulcanising agent, a vulcanisation accelerator, a blowing agent and an activator for the said blowing agent, wherein:

a. after milling 80 to 120 parts by weight of copolymer, the copolymer agent chosen from amongst any of the azodicarbonamides, and 9 to 11 parts by weight of carbon black;

b. 8 to 12 parts by weight of at least one vulcanising agent chosen from amongst any of the oxides and hydroxides of lead and calcium on the one hand, and the oxides and hydroxides of zinc and magnesium combined with at least one inorganic or organic salt of lead or zinc on the other hand, 1.8 to 2.2 parts by weight of an activator for the blowing agent and 0.7 to 0.9 part by weight of a vulcanisation accelerator are added to the mixture thus produced;

c. the resulting mixture is moulded at a temperature of approximately between 140°C and 200°C, and preferably at 150°C, under a pressure of between 60 and 100 kg/cm$^2$, and preferably at 80 kg/cm$^2$, for a minimum period of 30 minutes.

As will be understood, the moulding time is a function of the temperature and the pressure. It is preferably between 30 and 45 minutes. It is convenient to carry out the process under a pressure of between 60 and 100 kg/cm$^2$ in order to allow the excess material inside the mould to be expelled and to keep the sheet of foam planar, bearing in mind the evolution of gas which takes place.

The preferred vulcanising agent is litharge, PbO. According to a feature of the invention, the vulcanising agent can be combined with at least one inorganic or organic salt of lead or zinc.

According to another feature of the invention, at least one inorganic salt of lead or zinc must be added if an oxide or hydroxide of zinc or magnesium is used. Amongst the salts which can be used, there may be mentioned especially the salts of lead and zinc which are produced with hydrochloric, hydrobromic, carbonic, oxalic, tartaric and stearic acids. The salts which are preferred are those which, in solution, have a neutral or alkaline pH, such as zinc stearate and lead stearate.

According to a preferred method of carrying out the process of the invention, a crosslinking activator preferably chosen from primary and secondary aromatic amines, is incorporated at stage a). The amount of crosslinking activator to be used is generally between 0.4 and 3 parts by weight, and preferably between 0.4 to 1.2 parts by weight. Such an additive is necessary when the vinylidene fluoride/hexafluoropropylene copolymer raw material does not contain any crosslinking activator.

The purpose of the crosslinking activator is to activate the vulcanisation accelerator. Amongst the crosslinking activators which may be used are benzylamine, dibenzylamine, aniline, methylaniline and diphenylamine. From 2 to 2.9 parts by weight of Diak Super 6, which is the trade name for a composition sold by E. I. du Pont de Nemours, or a composition containing 2 parts by weight of dibenzylamine absorbed on 3 parts by weight of silica, can for example be used as the crosslinking activator.

The blowing agent is an azodicarbonamide. Amongst the substances which can be used, there may be mentioned especially azodicarbonamide itself:

$$H_2N - CO - N = N - CO - NH_2$$

and its N-substituted homologues, such as, for example, N,N'-di-(tertiary butyl)-azo-bis-formamide, N,N'-di-(n-decyl)-azo-bis-formamide and N,N'-diphenyl-azo-bis-formamide. These substances decompose on heating to give a mixture of gases, composed principally of nitrogen and carbon monoxide.

The vulcanisation catalyst, which is also called the vulcanisation accelerator by those skilled in the art, is generally a substituted or unsubstituted phenol or quinone. Amongst the mono- and poly-phenols which can be used, there may be mentioned, in addition to phenol, o-, m- and p- chlorophenols, p-nitrosophenol, guaiacol, the cresols, resorcinol, hydroquinone, pyrocatechol, pyrogallol, phloroglucinol and the α- and β-naphthols. Amongst the quinones, there may be mentioned especially benzoquinone and tetrachlorobenzoquinone or para-quinone-dioxime.

According to another characteristic of the invention, the activator for the blowing agent is glycol, and preferably diethylene glycol.

In order that the invention may be more fully understood, the following Examples are given, by way of illustration only.

EXAMPLE 1

100 parts by weight of Viton A (trade name of a vinylidene fluoride/hexafluoropropylene copolymer, containing 65 percent of fluorine, which is made by E. I. du Pont de Nemours) were milled, and 10 parts by weight of carbon black, 7 parts by weight of Genitron AC 4 (trade name of azodicarbonamide) and 2.4 parts by weight of Diak Super 6 were incorporated.

10 parts by weight of litharge, 0.8 part by weight of hydroquinone, 2 parts by weight of diethylene glycol (activator for the blowing agent) and 10 parts by weight of carbon black were added to the mixture thus produced.

The mixture was then moulded in a circular mould, 100 mm in diameter and 5 mm thick, at a temperature of 150°C under pressure of 80 kg/cm² for 35 minutes. A circular foam of 200 mm diameter and 10 mm thickness, with an acceptable region of 200 mm in diameter was obtained the mechanical properties of this are given in Table I.

EXAMPLE 2

The procedure of Example 1 was repeated except that 5 parts by weight, instead of 7 parts by weight, of azodicarbonamide were used. Using the mould of Example 1 and under the same conditions of temperature, pressure and time, a foam of 200 mm diameter and 10 mm thickness, with an acceptable region of 200 mm diameter, was obtained. The mechanical properties of this foam are given in Table I.

Examples 3 and 4 illustrate the preparation of a closed-cell foam from a vinylidene fluoride/hexafluoropropylene copolymer containing a crosslinking activator.

EXAMPLE 3

The procedure of Example 1 was repeated using 100 parts by weight of Viton E 60C (trade name of a vinylidene fluoride/hexafluoropropylene copolymer sold by E. I. du Pont de Nemours, containing approximately 2.4 g of crosslinking activator per 100 g of copolymer, without incorporating any Diak Super 6. A foam was obtained which had substantially the same properties as that produced in Example 1.

EXAMPLE 4

Following the procedure of Example 2 but using 100 parts by weight of Viton E 60C without incorporating any Diak Super 6, a foam was obtained which had substantially the same properties as that of Example 2.

TABLE I

| Physical properties | Foam according to Examples 1 and 3 | Foam according to Examples 2 and 4 |
| --- | --- | --- |
| Density | 0.3 | 0.6 |
| Compressive strength (bars) | | |
| at 25% compression (a) | 0.8±0.2 | 3.7±0.5 |
| at 50% compression (a) | 1.8±0.3 | 5.2±0.7 |
| Permanent compressive deformation, %, at 50% compression (b) | 50±10 | 40±10 |
| Water absorption (%)(c) | 0.3 to 0.5 | 0.2 to 0.4 |
| Heat resistance: | | |
| continuous | 100°C | 100°C |
| momentary | 150°C | 150°C |
| Resistance to cold | −40°C | −40°C |

Notes:
(a) on a test piece, of thickness 13 mm, according to standard specification ASTMD - 1,056.
(b) on a test piece, of thickness 13 mm for 22 hours at 70°C, according to method B of standard specification ASTMD - 395.
(c) according to standard specification ASTMD - 1,056, suffix L.

COMPARISON EXAMPLE

This example is given to shown the technical advance provided by the process of the invention over prior proposals.

A closed-cell Viton foam was prepared from the following mixture:

| | Parts by weight |
| --- | --- |
| Viton A | 100 |
| MgO 7H₂O | 15 |
| Carbon black | 25 |

-Continued

| | |
|---|---|
| Petrolatum | 3 |
| Hexamethylenediamine carbamate | 1.25 |
| (sold under the trade name of Diak No. 1) | |
| Azodicarbonamide | 5 |
| Ethylene glycol | 2 | by vulcanising under pressure at 172°C for 30 minutes (recommended optimum temperature and duration) under a pressure of 80 kg/cm². Using a mould of diameter 100 mm and thickness 5 mm, a moulded article of diameter 200 mm with an acceptable region of foam of diameter 60 mm and thickness 10 mm, having the following properties, was obtained:

| | |
|---|---|
| Density | 0.3 |
| Compressive strength at: | |
| 25% compression | 0.7 kg/cm² |
| 50% compression | 1.4 kg/cm² |
| Permanent compressive deformation (22 hours at 70°C), at 50% compression | 55% |
| Water absorption | 0.6% |

The process according to the invention makes it possible to obtain foams of vinylidene fluoride/hexafluoropropylene copolymers without losing a large amount of copolymers as was the case according to the method of the prior art.

If, in the comparison example, the procedure is carried out at a vulcanisation temperature of about 150°C for 30 to 60 minutes, either a closed-cell foam is not obtained or the acceptable region which can be obtained has a diameter which is less than that of the acceptable region obtained according to the said comparison example.

Table II below gives the yields of Viton foam obtained relative to the starting copolymer. All the foams were prepared according to the method of Example 1, replacing the vulcanising agent, namely litharge, by an equal amount of metal oxides or hydroxides, optionally combined with lead or zinc salts.

TABLE II

| Vulcanising agent (10 parts) | Yield % |
|---|---|
| PbO | 95 |
| CaO | 50 |
| MgO | Less than 15 |
| ZnO | Less than 15 |
| Ca(OH)₂ | 50 |
| ZnO (8 parts) + PbCl₂ (2 parts) | 45 |
| ZnO (5 parts) + PbCl₂ (5 parts) | 50 |
| CaO (5 parts) + zinc stearate (5 parts) | 60 |
| MgO (5 parts) + zinc stearate (5 parts) | 50 |

It is apparent from the experiments recorded in Table II that the addition of the metal salt according to the invention improves the yield in the case of magnesium and zinc oxides. If these oxides are used alone they are industrially rather unprofitable because of the excessive waste of copolymers. On the other hand, if the vulcanising agent is PbO or CaO, the vulcanisation takes place with identical yields whether or not a salt is added; however, the incorporation of a salt makes all the operations easier.

In general terms, the foams produced according to the process of the invention have good resistance to:
  a. inorganic acids and bases,
  b. organic acids and bases,
  c. hydrocarbons (very good in the case of benzene),
  d. halogenated hydrocarbons (especially very good in the case of perchloroethylene) and
  3. alcohols.

I claim:

1. Process for the preparation of a closed-cell foam from a vinylidene fluoride/hexafluoropropylene copolymer of low viscosity, which comprises moulding a mixture comprising 80 to 120 parts by weight of the milled copolymer, 4 to 8 parts by weight of an azodicarbonamide blowing agent, 9 to 11 parts by weight of carbon black, 8 to 12 parts by weight of at least one vulcanising agent selected from the oxides and hydroxides of lead and calcium, mixtures of the oxides and hydroxides of lead or calcium with a salt selected from the inorganic and organic salts of lead and zinc, a mixture of ZnO and PbCl₂, and a mixture of MgO and zinc stearate, 1.8 to 2.2 parts by weight of an activator for the blowing agent, and 0.7 to 0.9 part by weight of a vulcanisation accelerator; the moulding being effected by a temperature of approximately from 140°C to 200°C, under a pressure of from 60 to 100 kg/cm², for a minimum period of about 30 minutes.

2. Process according to claim 1, wherein the vulcanising agent is selected from oxides and hydroxides of lead and calcium mixed with a salt selected from inorganic and organic salts of zinc and lead.

3. Process according to claim 1, wherein the vulcanising agent comprises litharge.

4. Process according to claim 2, wherein the said salt is selected from zinc stearate and lead stearate.

5. A process according to claim 3, wherein the vulcanising agent is a mixture of litharge and a salt selected from zinc stearate and lead stearate.

6. Process according to claim 1, wherein the blowing agent is selected from azodicarbonamide and its N-substituted homologues.

7. Process according to claim 6, wherein the blowing agent is selected from N,N'-di-(tertiary butyl)-azo-bis-formamide, N,N'-di-(n-decyl)-azo-bis-formamide and N,N'-diphenyl-azo-bis-formamide.

8. Process according to claim 1, wherein the vulcanisation accelerator is selected from substituted and unsubstituted quinones and phenols.

9. Process according to claim 8, wherein the vulcanisation accelerator is selected from phenol, o-, m- and p-chlorophenol, guaiacol, the cresols, resorcinol, hydroquinone, pyrocatechol, pyrogallol, phloroglucinol, the α- and β-naphthols, benzoquinone, tetrachlorobenzoquinone and para-benzoquinonedioxime.

10. Process according to claim 1, wherein the activator for the blowing agent is a glycol.

11. Process according to claim 1, wherein a cross-linking activator selected from primary and secondary aromatic amines is incorporated in the moulding mixture.

12. Process according to claim 1, wherein the cross-linking activator is dibenzylamine.

13. Process according to claim 1, wherein the vulcanizing agent is PbO, CaO, Ca(OH)₂, a mixture of ZnO and PbCl₂, a mixture of CaO and zinc stearate or a mixture of MgO and zinc stearate.

* * * * *